(12) United States Patent
Tang (10) Patent No.: US 11,064,529 B2
(45) Date of Patent: Jul. 13, 2021

(54) SIGNAL TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/469,751

(22) PCT Filed: Dec. 21, 2016

(86) PCT No.: PCT/CN2016/111384
§ 371 (c)(1),
(2) Date: Jun. 14, 2019

(87) PCT Pub. No.: WO2018/112808
PCT Pub. Date: Jun. 28, 2018

(65) Prior Publication Data
US 2020/0100292 A1    Mar. 26, 2020

(51) Int. Cl.
*H04W 74/08* (2009.01)
*H04L 5/00* (2006.01)
*H04W 74/00* (2009.01)

(52) U.S. Cl.
CPC ....... *H04W 74/0833* (2013.01); *H04L 5/0023* (2013.01); *H04W 74/004* (2013.01)

(58) Field of Classification Search
None
See application file for complete search history.

(56) References Cited

U.S. PATENT DOCUMENTS

2015/0305014 A1  10/2015  Li et al.
2015/0312864 A1  10/2015  Jung
(Continued)

FOREIGN PATENT DOCUMENTS

CA   2844374    2/2013
CN   102934381  2/2013
(Continued)

OTHER PUBLICATIONS

WIPO, ISR for PCT/CN2016/111384, dated Sep. 1, 2017.
Fujitsu, "Discussion on PRACH configuration in NR," 3GPP TSG RAN WG1 Meeting #87, R1-1611461, Nov. 2016, 5 pages.
Fujitsu, "Discussion on RAR in NR considering reciprocity issues," 3GPP TSG RAN WG1 Meeting #87, R1-1611462, Nov. 2016, 6 pages.
(Continued)

*Primary Examiner* — James P Duffy
(74) *Attorney, Agent, or Firm* — Hodgson Russ LLP (57) ABSTRACT

A signal transmission method comprises: a terminal device determining beam information about N groups of random access signals, wherein the beam information about the N groups of random access signals is the same, and each group of random access signals comprises M random access signals, M and N being positive integers; if the terminal device sends the N groups of random access signals to a network device according to the beam information about the N groups of random access signals, while does not receive a response message sent by the network device for the N groups of random access signals, redetermining the beam information about the N groups of random access signals; and the terminal device re-transmitting at least one random access signal in the N groups of random access signals to the network device according to the redetermined beam information about the N groups of random access signals.

30 Claims, 7 Drawing Sheets

(56) References Cited

U.S. PATENT DOCUMENTS

2016/0066197 A1 3/2016 Park et al.
2016/0192401 A1 6/2016 Park et al.

FOREIGN PATENT DOCUMENTS

| CN | 103974446 | 8/2014 |
|---|---|---|
| CN | 104521312 | 4/2015 |
| CN | 105379336 | 3/2016 |
| CN | 105812035 | 7/2016 |
| EP | 3048851 | 7/2016 |
| KR | 20150015447 | 2/2015 |
| RU | 2472318 | 1/2013 |
| RU | 2587651 | 6/2016 |
| WO | 2014110772 | 7/2014 |
| WO | 2016086144 | 6/2016 |
| WO | 2016154835 | 10/2016 |
| WO | 2016195346 | 12/2016 |

OTHER PUBLICATIONS

LG Electronics, "Rach Procedure Considering Multi-TRP Operation," 3GPP TSG RAN WG1 Meeting #87, R1-1613120, Nov. 2016, 5 pages.
Zte et al., "Unified RACH procedure," 3GPP TSG RAN WG1 Meeting #87, R1-1611273, Nov. 2016, 9 pages.
EPO, Office Action for EP Application No. 16924546.1, dated Nov. 19, 2019.
Canadian Intellectual Property Office, Office Action for CA Application No. 3047671, dated Jul. 16, 2020.
SIPO, First Office Action for CN Application No. 201680091425.5, dated Jun. 2, 2020.
Rospatent, Office Action for RU Application No. 2019122655, dated Feb. 3, 2020.
INPI, Preliminary Office Action for BR Application No. 112019012286-9, dated Sep. 24, 2020.
IPI, Office Action for IN Application No. 201917028446, dated Jan. 25, 2021.
TIPO, Office Action for TW Application No. 106141980, dated May 4, 2021.

SIGNAL TRANSMISSION METHOD, TERMINAL DEVICE AND NETWORK DEVICE

CROSS-REFERENCE TO RELATED APPLICATION

This application is a U.S. national phase application of International Application No. PCT/CN2016/111384, filed Dec. 21, 2016, the entire disclosure of which is incorporated herein by reference.

TECHNICAL FIELD

The embodiments of the present application relate to the field of wireless communications, and, more particularly, to a signal transmission method, a terminal device, and a network device.

BACKGROUND

Currently, in a 5G system (or a New Radio, "NR", system), multi-beam (or analog beamformed) is supported, and different beams correspond to different directions and the different coverage areas. Therefore, in a random access process, if a beam of a network device and a beam of a terminal device do not match well, the transmission will fail, which seriously affects the efficiency of random access.

SUMMARY

The embodiments of the present application provide a signal transmission method, a terminal device, and a network device.

In a first aspect, there is provided a signal transmission method, including: a terminal device determining beam information about N groups of random access signals, wherein the beam information about the N groups of random access signals is the same, and each group of random access signals includes M random access signals, M being a positive integer and N being a positive integer; if the terminal device sends the N groups of random access signals to a network device according to the beam information about the N groups of random access signals, while does not receive a response message sent by the network device for the N groups of random access signals, redetermining the beam information about the N groups of random access signals; and the terminal device re-transmitting at least one random access signal in the N groups of random access signals to the network device according to the redetermined beam information about the N groups of random access signals.

Optionally, in an implementation manner of the first aspect, the method further includes: if the terminal device receives a response message sent by the network device for at least one random access signal that has been sent in the N groups of random access signals during sending of the N groups of random access signals, stopping sending other unsent random access signals in the N groups of random access signals to the network device.

Optionally, in an implementation manner of the first aspect, the beam information about the N groups of random access signals redetermined by the terminal device is different from beam information about the N groups of random access signals sent last time.

Optionally, in an implementation manner of the first aspect, the M random access signals are sent using a same beam or different beams.

Optionally, in an implementation manner of the first aspect, the beam information about each group of random access signals includes a beam for transmitting the M random access signals, and/or a corresponding relationship between a location of a time-frequency resource used to transmit the random access signals and the beam.

Optionally, in an implementation manner of the first aspect, before a terminal device determines beam information about N groups of random access signals, the method further includes: the terminal device receiving indication information sent by the network device, wherein the indication information is used to indicate N and/or M.

Optionally, in an implementation manner of the first aspect, if the indication information is used to indicate N, M is equal to a preset value; or if the indication information is used to indicate M, N is equal to a preset value.

Optionally, in an implementation manner of the first aspect, at least one of a time domain resource for transmitting the M random access signals, a frequency domain resource for transmitting the M random access signals, and a sequence used by the M random access signals is identical, or all of them are different.

Optionally, in an implementation manner of the first aspect, a time-frequency resource for transmitting the M random access signals satisfies a preset hopping mode.

Optionally, in an implementation manner of the first aspect, a time-frequency resource for transmitting the M random access signals is continuous or discontinuous in a time domain.

In a second aspect, there is provided a signal transmission method, including: if a network device does not successfully receive N groups of random access signals sent by a terminal device according to beam information about the N groups of random access signals, prohibiting sending a response message for the N groups of random access signals to the terminal device, wherein the beam information about the N groups of random access signals is the same, and each group of random access signals includes M random access signals, M being a positive integer and N being a positive integer; the network device re-receiving at least one random access signal in the N groups of random access signals sent by the terminal device according to the redetermined beam information about the N groups of random access signals.

Optionally, in an implementation manner of the second aspect, the method further includes: if the network device successfully receives the random access signal sent by the terminal device during receiving of the N groups of random access signals, sending a response message of at least one random access signal that has been received in the N groups of random access signals to the terminal device.

Optionally, in an implementation manner of the second aspect, the beam information about the N groups of random access signals redetermined by the terminal device is different from beam information about the N groups of random access signals sent last time.

Optionally, in an implementation manner of the second aspect, the M random access signals are sent using a same beam or different beams.

Optionally, in an implementation manner of the second aspect, the beam information about each group of random access signals includes a beam for transmitting the M random access signals, and/or a corresponding relationship between a location of a time-frequency resource used to transmit the random access signals and the beam.

Optionally, in an implementation manner of the second aspect, before the network device prohibits sending a response message for the N groups of random access signals to the terminal device, the method further including:

the network device sending indication information to the terminal device, wherein the indication information is used to indicate N and/or M.

Optionally, in an implementation manner of the second aspect, if the indication information is used to indicate N, M is equal to a preset value; or if the indication information is used to indicate M, N is equal to a preset value.

Optionally, in an implementation manner of the second aspect, at least one of a time domain resource for transmitting the M random access signals, a frequency domain resource for transmitting the M random access signals, and a sequence used by the M random access signals is identical, or all of them are different.

Optionally, in an implementation manner of the second aspect, a time-frequency resource for transmitting the M random access signals satisfies a preset hopping mode.

Optionally, in an implementation manner of the second aspect, a time-frequency resource for transmitting the M random access signals is continuous or discontinuous in a time domain.

In a third aspect, there is provided a terminal device, which may perform the operations of the terminal device in the foregoing first aspect or any optional implementations of the first aspect. In particular, the terminal device may include a modular unit for performing the operations of the terminal device in the foregoing first aspect or any possible implementation of the first aspect.

In a fourth aspect, there is provided a network device, which may perform the operations of the network device in the foregoing second aspect or any optional implementations of the second aspect. In particular, the network device may include a modular unit for performing the operations of the network device in the foregoing second aspect or any possible implementation of the second aspect.

In a fifth aspect, there is provided a terminal device, including: a processor, a transceiver, and a memory. The processor, the transceiver, and the memory communicate with each other through an internal connection path. The memory is for storing instructions. The processor is for executing instructions stored by the memory. When the processor executes the instructions stored by the memory, the execution causes the terminal device to perform the method in the first aspect or any possible implementations of the first aspect, or the execution causes the terminal device to implement the terminal provided by the third aspect.

In a sixth aspect, there is provided a network device, including: a processor, a transceiver, and a memory. The processor, the transceiver, and the memory communicate with each other through an internal connection path. The memory is for storing instructions. The processor is for executing instructions stored by the memory. When the processor executes the instructions stored by the memory, the execution causes the network device to perform the method in the second aspect or any possible implementations of the second aspect, or the execution causes the network device to implement the network device provided by the fourth aspect.

In a seventh aspect, there is provided a computer readable storage medium. The computer readable storage medium stores a program causing a network device to perform the method of first aspect and any of its various implementations described above.

In an eighth aspect, there is provided a computer readable storage medium. The computer readable storage medium stores a program causing a network device to perform the method of second aspect and any of its various implementations described above.

In a ninth aspect, there is provided a system chip. The system chip includes an input interface, an output interface, a processor, and a memory. The processor is configured to execute an instruction stored by the memory, and when the instruction is executed, the processor may implement any method of the foregoing first aspect and any of its various implementations.

In a tenth aspect, there is provided a system chip. The system chip includes an input interface, an output interface, a processor, and a memory. The processor is configured to execute an instruction stored by the memory, and when the instruction is executed, the processor may implement any method of the foregoing second aspect and any of its various implementations.

DETAILED DESCRIPTION

The technical solutions in the embodiments of the present disclosure will be described in the following with reference to the accompanying drawings.

It should be understood that, the technical solutions of the embodiments of the present disclosure may be applied to various communication systems, for example, Global System of Mobile communication ("GSM") system, Code Division Multiple Access ("CDMA") System, Wideband Code Division Multiple Access ("WCDMA") system, Long Term Evolution ("LTE") system, LTE Frequency Division Duplex ("FDD") system, LTE Time Division Duplex ("TDD"), Universal Mobile Telecommunication System ("UMTS"), and a future 5G communication system, or the like.

The present application describes various embodiments in connection with a terminal device. The terminal device may also refer to User Equipment (UE), an access terminal, a subscriber unit, a subscriber station, a mobile radio station, a mobile station, a remote station, a remote terminal, a mobile device, a user terminal, a terminal, and a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device or a computing device with wireless communication functions or other processing devices connected to wireless modems, an in-vehicle device, a wearable device, a terminal device in the future 5G network or a terminal device in the future evolved PLMN network and the like.

The present application describes various embodiments in connection with a network device. The network device may be a device for communicating with a terminal device, where the network device may be a base station (Base Transceiver Station, BTS) in GSM or CDMA, or a base station (NodeB, NB) in a WCDMA system, or an evolved base station (Evolutional NodeB, eNB or eNodeB) in the LTE system, or the network device may be a relay station, an access point, an in-vehicle device, a wearable device, and a network side device in a future 5G network or a network side device in a future evolved PLMN network, or the like.

Figure 1:
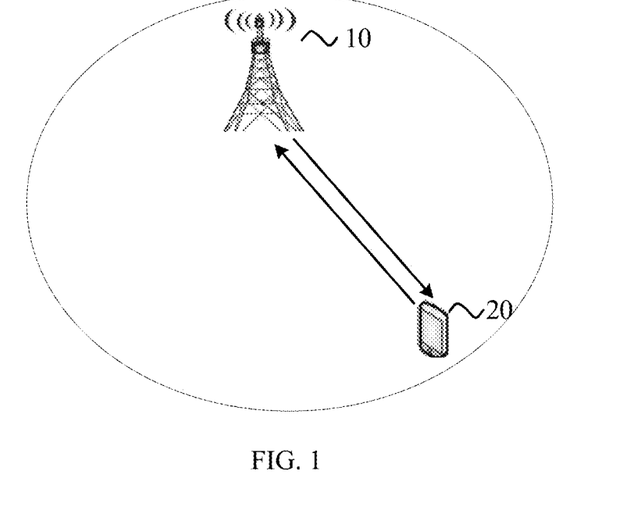
FIG. 1 is a schematic structural diagram of an application scenario of an embodiment of the present application.

FIG. 1 is a schematic diagram of an application scenario of an embodiment of the present disclosure. The communication system in FIG. 1 may include a network device 10 and a terminal device 20. The network device 10 is configured to provide communication services for the terminal device 20 and access a core network. The terminal device 20 may access the network by searching for synchronization signals, broadcast signals, and the like transmitted by the network device 10, thereby performing communication with the network. The arrows shown in FIG. 1 may represent uplink/downlink transmissions through a cellular link between the terminal device 20 and the network device 10.

The network in the embodiment of the present application may refer to a Public Land Mobile Network (PLMN), or a Device to Device (D2D) network, or a Machine to Machine/Man ("M2M") network, or other networks. FIG. 1 is only a simplified schematic diagram as an example, and the network may also include other terminal devices, which are not shown in FIG. 1.

Figure 2:
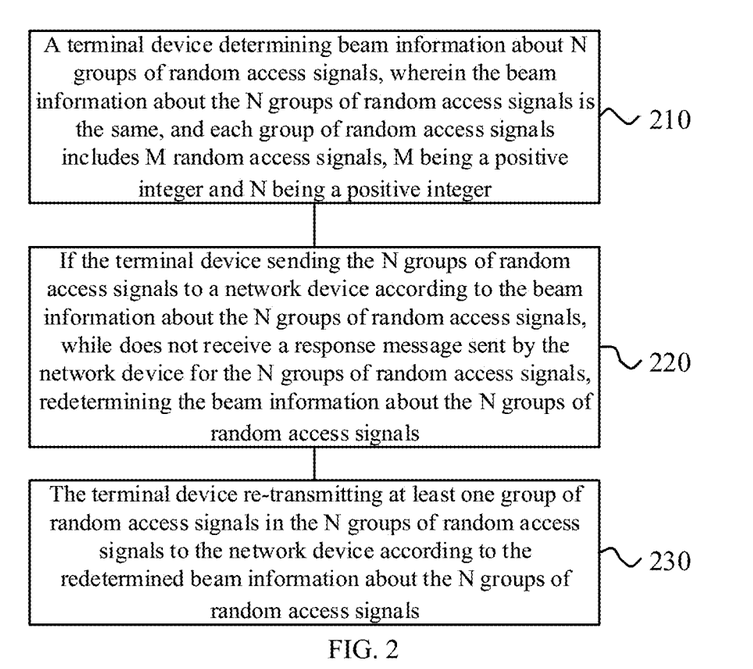
FIG. 2 is a schematic flowchart of a signal transmission method according to an embodiment of the present application.

FIG. 2 is a flowchart of a signal transmission method 200 in accordance with an embodiment of the present application. As shown in FIG. 2, the method may be performed by a terminal device, and the specific process of transmitting the signal includes following steps.

In 210, a terminal device determines beam information about N groups of random access signals.

In the embodiment, the beam information about the N groups of random access signals is the same, and each group of random access signals includes M random access signals, M being a positive integer and N being a positive integer.

Specifically, when the terminal device sends an uplink random access signal (referred to as a random access signal in the embodiment of the present application) to the network device, the beam information is firstly determined by using the N groups of random access signals as a unit. After determining the beam information for the N groups of random access signals, the terminal device may send the N groups of random access signals to the network device according to the beam information. Each group of random access signals includes M random access signals.

Optionally, beams for sending the M random access signals in each group of random access signals are identical or different.

That is to say, the M random access signals in each group of random access signals may be transmitted using the same beam, or may be transmitted using different beams respectively.

Optionally, the beam information about each group of random access signals includes a beam for transmitting the M random access signals, and/or a corresponding relationship between a location of a time-frequency resource used to transmit the random access signals and the beam.

For example, if the beams used to transmit the M random access signals in each group of random access signals are the same, the beam information may include the beams used by the M random access signals.

For another example, if the beams used to transmit the M random access signals in each group of random access signals are different, the beam information may include a corresponding relationship between a location of a time-frequency resource used to transmit the random access signals and the beam. The location of a time-frequency resource herein is a relative time-frequency resource location. A beam used by a random access signal corresponds to a relative position of the time-frequency resource of the random access signal in a time-frequency resource of the group of random access signals.

Figure 3:
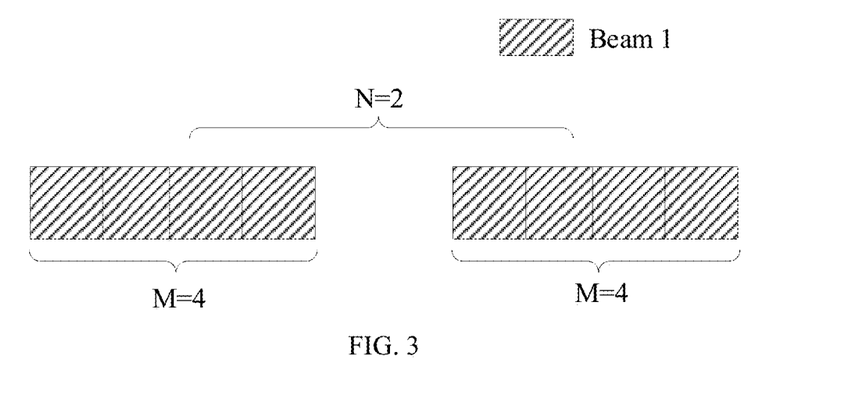
FIG. 3 is a schematic diagram of transmission of N groups of random access signals according to an embodiment of the present application.

For example, a transmission diagram of N groups of random access signals is shown in FIG. 3. In FIG. 3, for example, N=2 and M=4. That is, the terminal device transmits two groups of random access signals, and each group of random access signals includes four random access signals, and the four random access signals in each group use the same beam, i.e., beam 1. At this time, the beam information of the two groups of random access information may include information of beam 1.

Figure 4:
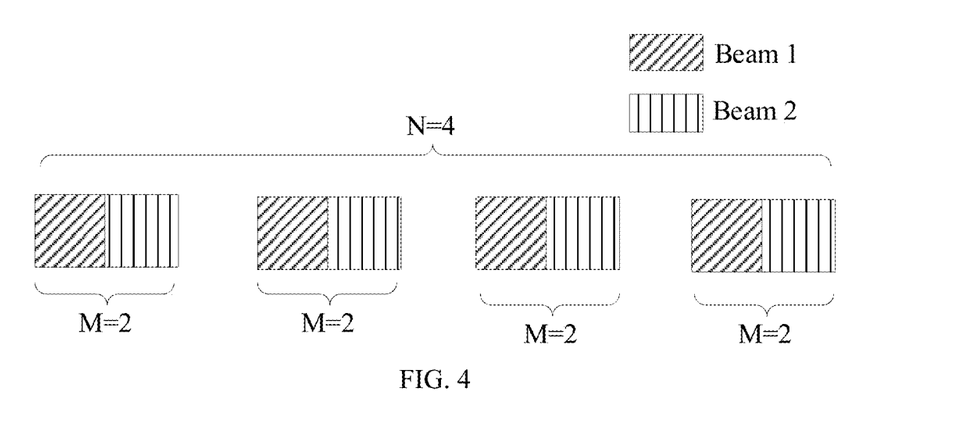
FIG. 4 is a schematic diagram of transmission of N groups of random access signals according to an embodiment of the present application.

For another example, a transmission diagram of N groups of random access signals is shown in FIG. 4. In FIG. 4, for example, N=4 and M=2. That is, the terminal device sends four groups of random access signals, and each group of random access signals includes two random access signals, and the two random access signals in each group use different beams. At this time, the beam information of the two groups of random access signals may include a corresponding relationship between a location of a time-frequency resource used to transmit the random access signal and the beam. The terminal device determines the beam used by each random access signal according to the beam information and resource locations respectively corresponding to the two random access signals in each group. It is assumed that the corresponding relationship in the beam information is shown in Table 1. Table 1 shows the corresponding relationship between the location of the time domain resource and the beam. The first random access signal in each group takes the first symbol for transmission, and the second random access signal in each group takes the second symbol for transmission, so the terminal device may determine that the first random access signal uses beam 1 and the second random access signal uses beam 2, according to Table 1.

TABLE 1

| time domain resource location | beam |
|---|---|
| first symbol | beam 1 |
| second symbol | beam 2 |

Optionally, before a terminal device determines beam information about N groups of random access signals, the method further includes: the terminal device receiving indication information sent by the network device, wherein the indication information is used to indicate N and/or M.

It should be understood that the values of M and N may also be agreed in advance by the terminal device and the network device, for example, the values of M and N specified in the protocol.

Optionally, if the indication information is used to indicate N, M is equal to a preset value; or if the indication information is used to indicate M, N is equal to a preset value.

For example, if the indication information received by the terminal device only includes N, the terminal device may determine that only one random access signal is included in each group according to the preset M=1.

Optionally, at least one of a time domain resource for transmitting the M random access signals, a frequency domain resource for transmitting the M random access signals, and a sequence used by the M random access signals is identical, or all of them are different.

Optionally, a time-frequency resource for transmitting the M random access signals satisfies a preset hopping mode.

Specifically, a time-frequency resource for the terminal device transmitting the M random access signals may satisfy a preset hopping mode. For example, by using the hopping mode in a certain domain or some domains (time domain, frequency domain, and sequence resources), the configuring parameters related to the hopping, the network may obtain subsequent corresponding parameters based on certain previous reference configuration, so that the terminal device may send the M random access signals according to the configured hopping mode.

Optionally, a time-frequency resource for transmitting the M random access signals is continuous or discontinuous in a time domain.

That is, the time-frequency resources of the M random access signals in each group may be continuously transmitted in the time domain, for example, the cases shown in FIG. 3 and FIG. 4, and the time-frequency resources of the M random access signals in each group in the time domain may also be discontinuous or partially continuous, which is not limited herein.

In 220, if the terminal device sends the N groups of random access signals to a network device according to the beam information about the N groups of random access signals, while does not receive a Random Access Response ("RAR") message sent by the network device for the N groups of random access signals, the beam information about the N groups of random access signals will be redetermined. In the embodiment of the present application, the random access response message (RAR message) is abbreviated as a response message.

In 230, the terminal device re-transmits at least one random access signal in the N groups of random access signals to the network device according to the redetermined beam information about the N groups of random access signals.

Optionally, the beam information about the N groups of random access signals redetermined by the terminal device is different from beam information about the N groups of random access signals sent last time.

Specifically, after determining the beam information of the current N groups of random access signals, the terminal device may sequentially send each group of the random access signals in the N groups of random access signals to the network device according to the beam information about the N groups of random access signals. If the terminal device sends N groups of random access signals to the network device according to the beam information about the N groups of random access signals, but does not receive a response message sent by the network device for the N groups of random access signals, the terminal device may redetermine the beam information about the N groups of random access signals and retransmit the random access signals according to the redetermined beam information. Herein, different beam information indicates different transmitting beam patterns, that is, corresponding relationship between different resource locations used to transmit the random access signals and different transmitting beams.

Optionally, if the terminal device receives a response message sent by the network device for at least one random access signal that has been sent in the N groups of random access signals during sending of the N groups of random access signals, stopping sending other unsent random access signals in the N groups of random access signals to the network device.

Figure 5:
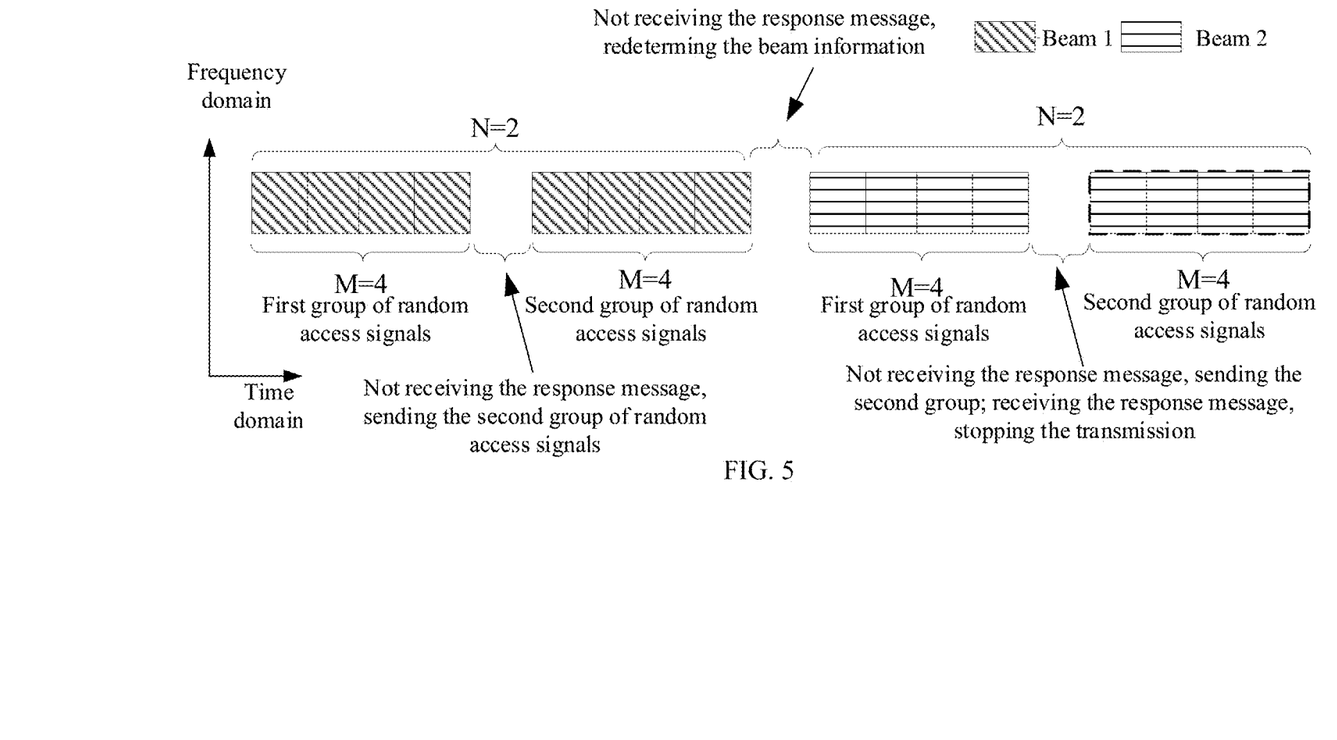
FIG. 5 is a schematic diagram of transmission of N groups of random access signals according to an embodiment of the present application.

For example, the transmission diagram of the N groups of random access signals is as shown in FIG. 5, for example, N=2 and M=4. That is, the terminal device currently transmits two groups of random access signals, and each group of random access signals includes four random access signals, and the four random access signals in each group use the same beam. It is assumed that the beam information of the two groups of random access signals currently transmitted by the terminal device indicates the beam 1, the terminal device firstly uses the beam 1 to send the first group of random access signals to the network device. If the terminal device does not receive the response message sent by network device for the first group of random the access signal, the terminal device still uses the beam 1 to send the second group of random access signals to the network device. Herein, since the beam information of the two groups of random access signals is the same, i.e., both being beam 1, the two groups of random reference signals are both sent with beam 1. If the terminal device does not receive the response message sent by the network device for the second group of random access signals either, the terminal device may redetermine the beam information about the two groups of random access signals, and send the random access signal to the network device according to the redetermined beam information.

It is assumed that the beam information redetermined by the terminal device indicates the beam 2, the terminal device continues to use the beam 2 to send the first group of random access signals to the network device. If the terminal device does not receive the response message sent by the network device for the first group of random access signals, the terminal device will still use the beam 2 to send the second group of random access signals the network device. Herein, since the redetermined beam information about the two groups of random access signals is beam 2, the two groups of random access signals are re-transmitted with the beam 2.

If receiving a response message sent by the network device for the first group of random access signals, the terminal device stops sending the second group of random access signals.

Figure 6:
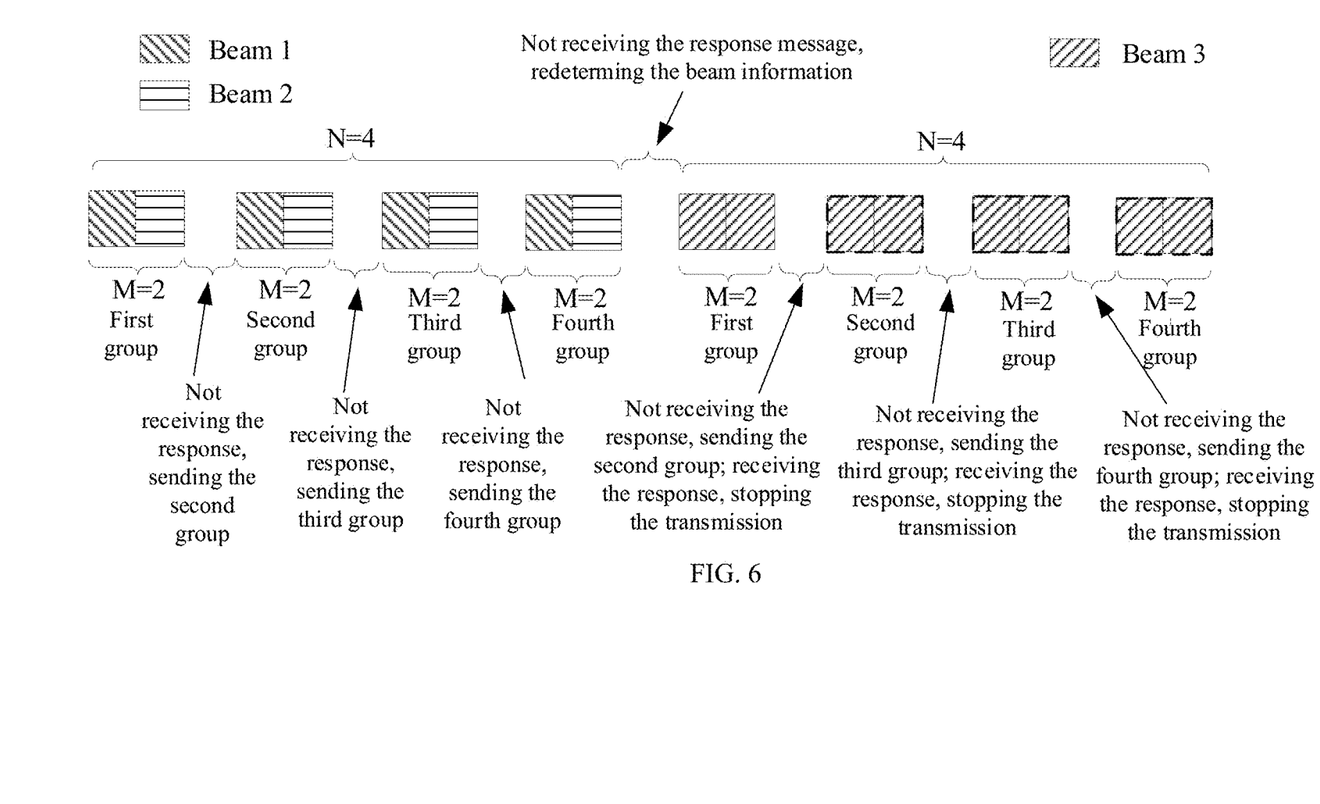
FIG. 6 is a schematic diagram of transmission of N groups of random access signals according to an embodiment of the present application.

For another example, a transmission diagram of N groups of random access signals is shown in FIG. 6, for example, N=4 and M=2. That is, the terminal device sends four groups of random access signals, and each group of random access signals includes two random access signals, and the two random access signals in each group use different beams.

It is assumed that the beam information about the four groups of random access signals to be sent by the terminal device includes the corresponding relationship between a location of a time-frequency resource used to transmit the random access signals and the beam as shown in Table 1, the terminal device sends the random access signal taking the first symbol in the first group to the network device using the beam 1, and sends the random access signal taking the second symbol in the first group to the network device using the beam 2. If the terminal device does not receive the response message sent by the network device for the first group of random access signals, the terminal device still uses the beam 1 to send the random access signal taking the first symbol in the second group to the network device, and uses the beam 2 to send the random access signal taking the second symbol in the second group to the network device. If the response message sent by the network device is still not received, the terminal device continues to send the third group of random access signals to the network device according to the beam information shown in Table 1, and so on. If the terminal device still does not receive the response message sent by the network device after sending the last group, i.e., the fourth group of random access signals to the network device, the terminal device may redetermine the beam information about the four groups of random access signals and transmit the random access signals to the network device according to the redetermined beam information.

It is assumed that the beam information redetermined by the terminal device includes the corresponding relationship between a location of a time-frequency resource used to transmit the random access signals and the beam shown in Table 2, the terminal device uses the beam 3 to send the random access signal taking the first symbol in the first group to the network device, and uses the beam 3 to send the random access signal taking the second symbol in the first group to the network device. If the terminal device does not receive the response message sent by the network device for the first group of random access signals, the terminal device continues to send the next group of random access signals to the network device according to the beam information shown in Table 2, and so on. If the terminal device receives a response message sent by the network device for the random access signal that has been sent in the four groups of random access signals during sending of the random access signals, the terminal device stops sending other unsent random access signals in the four groups of random access signals to the network device.

TABLE 2

| time domain resource location | beam |
|---|---|
| first symbol | beam 3 |
| second symbol | beam 3 |

It should be understood that when detecting the response message sent by the network device, the terminal device may detect the response message while transmitting the random access signals, and stop sending the random access signal if the response message sent by the network device is detected. For example, it is assumed that M=4, N=2, if the terminal device detects the response message sent by the network device just after transmitting the first random access signal in the first group of random access signals, the terminal device does not need to send the second to fourth random access signals in the first group and do not need to send the random access signals in the second group either.

It is also possible to detect a response message for one group of random access signals after transmitting this group of random access signals (for example, as shown in FIG. 5 and FIG. 6), and if a response message sent by the network device is detected, it is not necessary to send the following groups of random access signals. If no response message sent by the network device is detected, the terminal device continues to send the next group of random access signals, and detects the response message for the next group of random access signals after the transmission of the next group of random access signals is finished. For example, it is assumed that M=4, N=2, after sending four random access signals in the first group of random access signals, the terminal device detects the response message sent by the network device for the first group of random access signals. If the response message is detected, the transmission of the random access signal is stopped. If the terminal device does not detect the response message sent by the network device after transmitting the four random access signals in the first group of random access signals, the terminal device continues to send the four random access signals in the second group of random access signals.

Therefore, the terminal device transmits N groups of random access signals to the network device by using the same beam information, so that the network device may effectively determine the receiving beam that matches the transmitting beam used to transmit the random access signal, so as to successfully receive the random access signal sent by the terminal device, thus improving the efficiency of random access of the terminal device and reducing the delay.

Figure 7:
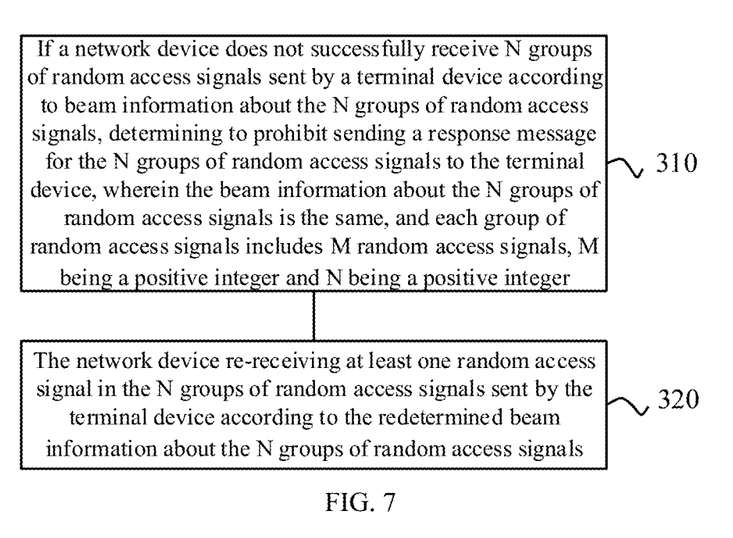
FIG. 7 is a schematic flowchart of a signal transmission method according to an embodiment of the present application.

FIG. 7 is a flowchart of a signal transmission method 300 according to an embodiment of the present application. As shown in FIG. 7, the method may be performed by a network device, and the specific process of transmitting the signal includes following steps.

In 310, if a network device does not successfully receive N groups of random access signals sent by a terminal device according to beam information about the N groups of random access signals, it is determined to prohibit sending a response message for the N groups of random access signals to the terminal device.

In the embodiment, the beam information about the N groups of random access signals is the same, and each group of random access signals includes M random access signals, M being a positive integer and N being a positive integer.

Specifically, after receiving the random access signal sent by the terminal device, the network device may fail to receive the random access signal due to the mismatch between the receiving beam that receives the random access signal and the transmitting beam that the terminal device sends the random access signal, or the network requirement cannot be met due to a poor matching degree between the receiving beam and the transmitting beam. Therefore, the network device may determine whether to send a response message for the random access signal to the terminal device according to the receiving result of the random access signal. In the embodiment of the present application, when the terminal device sends a random access signal to the network device, the beam information will be determined by using the N groups of random access signals as a unit. If the network device does not successfully receive N groups of random access signals sent by a terminal device according to beam information about the N groups of random access signals, or the network device considers that the matching degree between the receiving beam that receives the random access signal and the transmitting beam that the terminal device sends the random access signal is poor which cannot meet the network requirement, the network device will not send the response message for the N groups of random access signals to the terminal device.

Optionally, the beams used to transmit the M random access signals in each group of random access signals are the same or different.

That is to say, the M random access signals in each group of random access signals may be transmitted using the same beam, or may be transmitted using different beams respectively.

Optionally, the beam information about each group of random access signals includes a beam for transmitting the M random access signals, and/or a corresponding relationship between a location of a time-frequency resource used to transmit the random access signals and the beam.

For example, if the beams used to transmit the M random access signals in each group of random access signals are the same, the beam information may include the beams used by the M random access signals.

For another example, if the beams used to transmit the M random access signals in each group of random access signals are different, the beam information may include a corresponding relationship between a location of a time-frequency resource used to transmit the random access signals and the beam.

In the embodiment, for example, the transmission of the N groups of random access signals according to the beam information may refer to the related descriptions of FIG. 3 and FIG. 4. For the sake of brevity, it will not be repeated herein.

Optionally, before a terminal device receives the N groups of random access signals sent by the terminal device according to the beam information about the N groups of random access signals, the method further includes: the network device sending indication information to the terminal device, wherein the indication information is used to indicate N and/or M.

It should be understood that the values of M and N may also be agreed in advance by the terminal device and the network device, for example, the values of M and N specified in the protocol.

Optionally, if the indication information is used to indicate N, M is equal to a preset value; or if the indication information is used to indicate M, N is equal to a preset value.

For example, if the indication information received by the terminal device only includes N, the terminal device may determine that only one random access signal is included in each group according to the preset M=1.

Optionally, at least one of a time domain resource for transmitting the M random access signals, a frequency domain resource for transmitting the M random access signals, and a sequence used by the M random access signals is identical, or all of them are different.

Optionally, a time-frequency resource for transmitting the M random access signals satisfies a preset hopping mode.

Optionally, a time-frequency resource for transmitting the M random access signals is continuous or discontinuous in a time domain.

In 320, the network device re-receives at least one random access signal in the N groups of random access signals sent by the terminal device according to the redetermined beam information about the N groups of random access signals.

Optionally, the beam information about the N groups of random access signals redetermined by the terminal device is different from beam information about the N groups of random access signals sent last time.

Optionally, if the network device successfully receives the random access signal sent by the terminal device during receiving of the N groups of random access signals, the network device sends a response message of at least one random access signal that has been received in the N groups of random access signals to the terminal device.

Specifically, if the network device does not successfully receive the N groups of random access signals sent by the terminal device according to the beam information about the N groups of random access signals, the network device does not send a response message of the N groups of random access signals to the terminal device. Then, the terminal device may redetermine the beam information about the N groups of random access signals due to not receiving the response message of the N groups of random access signals sent by the network device, and resend the random access signals according to the redetermined beam information. Therefore, the network device may re-receive at least one random access signal in the N groups of random access signals sent by the terminal device according to the redetermined beam information about the N groups of random access signals.

If the network device successfully receives the random access signal sent by the terminal device during the receiving of the N groups of random access signals, the network device will send the response message of at least one random access signal that has been received in the N groups of random access signals to the terminal device, the terminal device may receive the response message of at least one random access signal that has been sent in the N groups of random access signals sent by the network device during the transmission of the N groups of random access signals, and stop sending other unsent random access signals in the N groups of random access signals to the network device.

In the embodiment, for example, the transmission of the N groups of random access signals according to the beam information may refer to the related descriptions of FIG. 5 and FIG. 6. For the sake of brevity, it will not be repeated herein.

In the embodiment, the network device may effectively determine the receiving beam that matches the transmitting beam used to transmit the random access signal by receiving the N groups of random access signals sent by the terminal device using the same beam information, so as to successfully receive the random access signal sent by the terminal device, thus improving the efficiency of random access of the terminal device and reducing the delay.

Figure 8:
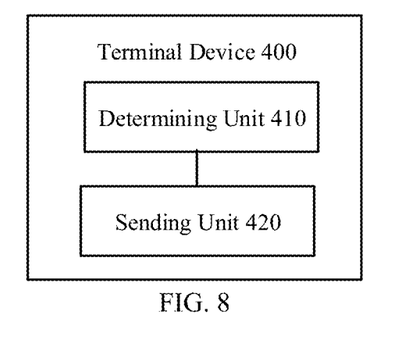
FIG. 8 is a schematic block diagram of a terminal device according to an embodiment of the present application.

FIG. 8 is a schematic block diagram of a terminal device 400 according to an embodiment of the present application. As shown in FIG. 8, the terminal device 400 includes a determining unit 410 and a sending unit 420.

In the embodiment, the determining unit 410 is configured to: determine beam information about N groups of random access signals, wherein the beam information about the N groups of random access signals is the same, and each group of random access signals includes M random access signals, M being a positive integer and N being a positive integer; if the terminal device sends the N groups of random access signals to a network device according to the beam information about the N groups of random access signals, while does not receive a response message sent by the network device for the N groups of random access signals, redetermine the beam information about the N groups of random access signals; and the sending 420 unit is configured to: re-transmit at least one random access signal in the N groups of random access signals to the network device according to the redetermined beam information about the N groups of random access signals.

Therefore, in the embodiment, the terminal device transmits N groups of random access signals to the network device by using the same beam information, so that the network device may effectively determine a receiving beam that matches a transmitting beam used to transmit the random access signal, so as to successfully receive the random access signal sent by the terminal device, thus improving the efficiency of random access of the terminal device and reducing the delay.

Optionally, the sending unit is further configured to: if the terminal device receives a response message sent by the network device for at least one random access signal that has been sent in the N groups of random access signals during sending of the N groups of random access signals, stop sending other unsent random access signals in the N groups of random access signals to the network device.

Optionally, the beam information about the N groups of random access signals redetermined by the terminal device is different from beam information about the N groups of random access signals sent last time.

Optionally, beams for sending the M random access signals are identical or different.

Optionally, the beam information about each group of random access signals includes a beam for transmitting the M random access signals, and/or a corresponding relationship between a location of a time-frequency resource used to transmit the random access signals and the beam.

Optionally, the terminal device further includes a receiving unit, configured to: before the determining unit determines beam information about N groups of random access signals, receive indication information sent by the network device, wherein the indication information is used to indicate N and/or M.

Optionally, if the indication information is used to indicate N, M is equal to a preset value; or if the indication information is used to indicate M, N is equal to a preset value.

Optionally, at least one of a time domain resource for transmitting the M random access signals, a frequency domain resource for transmitting the M random access signals, and a sequence used by the M random access signals is identical, or all of them are different.

Optionally, a time-frequency resource for transmitting the M random access signals satisfies a preset hopping mode.

Optionally, a time-frequency resource for transmitting the M random access signals is continuous or discontinuous in a time domain.

It should be understood that the terminal device 400 may correspond to the terminal device in the method embodiment, and the corresponding functions of the terminal device may be implemented. For brevity, details are not described herein again.

Figure 9:
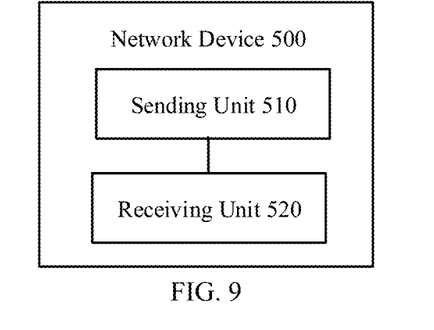
FIG. 9 is a schematic block diagram of a network device according to an embodiment of the present application.

FIG. 9 is a schematic block diagram of a network device 500 in accordance with an embodiment of the present application. As shown in FIG. 9, the network device 500 includes a sending unit 510 and a receiving unit 520.

In the embodiment, the sending unit 510 is configured to: if the network device does not successfully receive N groups of random access signals sent by a terminal device according to beam information about the N groups of random access signals, prohibit sending a response message for the N groups of random access signals to the terminal device, wherein the beam information about the N groups of random access signals is the same, and each group of random access signals includes M random access signals, M being a positive integer and N being a positive integer;

the receiving unit 520 is configured to: re-receive at least one random access signal in the N groups of random access signals sent by the terminal device according to the redetermined beam information about the N groups of random access signals.

Therefore, the network device may effectively determine the receiving beam that matches the transmitting beam used to transmit the random access signal by receiving the N groups of random access signals sent by the terminal device using the same beam information, so as to successfully receive the random access signal sent by the terminal device, thus improving the efficiency of random access of the terminal device and reducing the delay.

Optionally, the sending unit 510 is further configured to: if the network device successfully receives the random access signal sent by the terminal device during receiving of the N groups of random access signals, send a response message of at least one random access signal that has been received in the N groups of random access signals to the terminal device.

Optionally, the beam information about the N groups of random access signals redetermined by the terminal device is different from beam information about the N groups of random access signals sent last time.

Optionally, beams for sending the M random access signals are identical or different.

Optionally, the beam information about each group of random access signals includes a beam for transmitting the M random access signals, and/or a corresponding relationship between a location of a time-frequency resource used to transmit the random access signals and the beam.

Optionally, the sending unit 510 is further configured to: before the network device determines to prohibit sending a response message for the N groups of random access signals to the terminal device, send indication information to the terminal device, wherein the indication information is used to indicate N and/or M.

Optionally, if the indication information is used to indicate N, M is equal to a preset value; or if the indication information is used to indicate M, N is equal to a preset value.

Optionally, at least one of a time domain resource for transmitting the M random access signals, a frequency domain resource for transmitting the M random access signals, and a sequence used by the M random access signals is identical, or all of them are different.

Optionally, a time-frequency resource for transmitting the M random access signals satisfies a preset hopping mode.

Optionally, a time-frequency resource for transmitting the M random access signals is continuous or discontinuous in a time domain.

Figure 10:
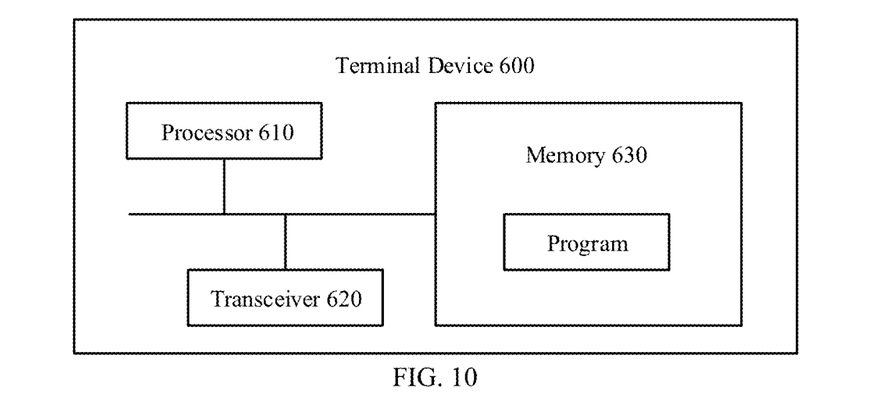
FIG. 10 is a schematic structural diagram of a terminal device according to an embodiment of the present application.

FIG. 10 is a schematic structural diagram of a terminal device 600 according to an embodiment of the present application. As shown in FIG. 10, the terminal device includes a processor 610, a transceiver 620, and a memory 630. The processor 610, the transceiver 620, and the memory 630 communicate with each other through an internal connection path. The memory 630 is configured to store instructions. The processor 610 is used for executing the instructions stored by the memory 630 to control the transceiver 620 to receive signals or transmit signals.

The processor 610 is configured to: determine beam information about N groups of random access signals, wherein the beam information about the N groups of random access signals is the same, and each group of random access signals includes M random access signals, M being a positive integer and N being a positive integer.

The processor 610 is further configured to: if the terminal device sends the N groups of random access signals to a network device according to the beam information about the N groups of random access signals, while does not receive a response message sent by the network device for the N groups of random access signals, redetermine the beam information about the N groups of random access signals.

The transceiver 620 is configured to: re-transmit at least one random access signal in the N groups of random access signals to the network device according to the redetermined beam information about the N groups of random access signals.

Therefore, in the embodiment, the terminal device transmits N groups of random access signals to the network device by using the same beam information, so that the network device may effectively determine a receiving beam that matches a transmitting beam used to transmit the random access signal, so as to successfully receive the random access signal sent by the terminal device, thus improving the efficiency of random access of the terminal device and reducing the delay.

Optionally, the transceiver 620 is further configured to: if the terminal device receives a response message sent by the network device for at least one random access signal that has been sent in the N groups of random access signals during sending of the N groups of random access signals, stop sending other unsent random access signals in the N groups of random access signals to the network device.

Optionally, the beam information about the N groups of random access signals redetermined by the terminal device is different from beam information about the N groups of random access signals sent last time.

Optionally, beams for sending the M random access signals are identical or different.

Optionally, the beam information about each group of random access signals includes a beam for transmitting the M random access signals, and/or a corresponding relationship between a location of a time-frequency resource used to transmit the random access signals and the beam.

Optionally, the transceiver 620 is further configured to: before the processor 610 determines beam information about N groups of random access signals, receive indication information sent by the network device, wherein the indication information is used to indicate N and/or M.

Optionally, if the indication information is used to indicate N, M is equal to a preset value; or if the indication information is used to indicate M, N is equal to a preset value.

Optionally, at least one of a time domain resource for transmitting the M random access signals, a frequency domain resource for transmitting the M random access signals, and a sequence used by the M random access signals is identical, or all of them are different.

Optionally, a time-frequency resource for transmitting the M random access signals satisfies a preset hopping mode.

Optionally, a time-frequency resource for transmitting the M random access signals is continuous or discontinuous in a time domain.

It should be understood that, in the embodiment of the present application, the processor 610 may be a central processing unit ("CPU"). The processor 610 may also be other general purpose processors, digital signal processors (DSPs), and application specific integrated circuits (ASICs), Field Programmable Gate Arrays (FPGAs) or other programmable logic devices, discrete gates or transistor logic devices, discrete hardware components, etc. The general purpose processor may be a microprocessor or the processor may also be any conventional processor or the like.

The memory 630 may include read only memory and random access memory and provides instructions and data to the processor 610. A portion of the memory 630 may also include a non-volatile random access memory. For example, the memory 630 may also store information of the device type.

In the implementation process, each step of the foregoing method may be completed by an integrated logic circuit of hardware in the processor 610 or an instruction in a form of software. The steps of the positioning method disclosed in combination with the embodiment of the present application may be directly implemented by the hardware processor, or may be performed by a combination of hardware and software modules in the processor 610. The software module may be located in a conventional storage medium such as random access memory, flash memory, read only memory, programmable read only memory or electrically erasable programmable memory, register, and the like. The storage medium is located in the memory 630, and the processor 610 reads the information in the memory 630 and completes the steps of the above method in combination with its hardware. To avoid repetition, it will not be described in detail herein.

The terminal device 600 according to the embodiment of the present application may correspond to the terminal device for performing the method 200 in the foregoing method 200, and the terminal device 400 according to the embodiment of the present application. Each unit or module in the terminal device 600 is used for performing operations or processes performed by the terminal device in the above method 200 respectively. Herein, in order to avoid redundancy, detailed description thereof will be omitted.

Figure 11:
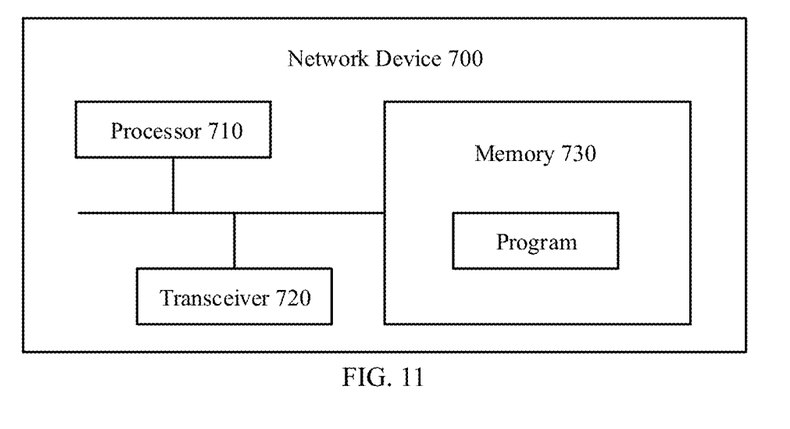
FIG. 11 is a schematic structural diagram of a network device according to an embodiment of the present application.

FIG. 11 is a schematic structural diagram of a network device 700 according to an embodiment of the present application. As shown in FIG. 11, the terminal device includes a processor 710, a transceiver 720, and a memory 730. The processor 710, the transceiver 720, and the memory 730 communicate with each other through an internal connection path. The memory 730 is configured to store instructions. The processor 710 is used for executing the instructions stored by the memory 730 to control the transceiver 720 to receive signals or transmit signals.

The transceiver 720 is configured to: if the network device does not successfully receive N groups of random access signals sent by a terminal device according to beam information about the N groups of random access signals, prohibit sending a response message for the N groups of random access signals to the terminal device, wherein the beam information about the N groups of random access signals is the same, and each group of random access signals includes M random access signals, M being a positive integer and N being a positive integer.

The transceiver 720 is further configured to: re-receive at least one random access signal in the N groups of random access signals sent by the terminal device according to the redetermined beam information about the N groups of random access signals.

Therefore, the network device may effectively determine the receiving beam that matches the transmitting beam used to transmit the random access signal by receiving the N groups of random access signals sent by the terminal device using the same beam information, so as to successfully receive the random access signal sent by the terminal device, thus improving the efficiency of random access of the terminal device and reducing the delay.

Optionally, the transceiver 720 is further configured to: if the network device successfully receives the random access signal sent by the terminal device during receiving of the N groups of random access signals, send a response message of at least one random access signal that has been received in the N groups of random access signals to the terminal device.

Optionally, the beam information about the N groups of random access signals redetermined by the terminal device is different from beam information about the N groups of random access signals sent last time.

Optionally, beams for sending the M random access signals are identical or different.

Optionally, the beam information about each group of random access signals includes a beam for transmitting the M random access signals, and/or a corresponding relationship between a location of a time-frequency resource used to transmit the random access signals and the beam.

Optionally, the transceiver 720 is further configured to: before the network device determines to prohibit sending a response message for the N groups of random access signals to the terminal device, send indication information to the terminal device, wherein the indication information is used to indicate N and/or M.

Optionally, if the indication information is used to indicate N, M is equal to a preset value; or if the indication information is used to indicate M, N is equal to a preset value.

Optionally, at least one of a time domain resource, a frequency domain resource for transmitting the M random access signals, and a used sequence is identical, or all of them are different.

Optionally, a time-frequency resource for transmitting the M random access signals satisfies a preset hopping mode.

Optionally, a time-frequency resource for transmitting the M random access signals is continuous or discontinuous in a time domain.

It should be understood that, in the embodiment of the present application, the processor 710 may be a central processing unit ("CPU"). The processor 710 may also be other general purpose processors, digital signal processors (DSPs), and application specific integrated circuits (ASICs), Field Programmable Gate Arrays (FPGAs) or other programmable logic devices, discrete gates or transistor logic devices, discrete hardware components, etc. The general purpose processor may be a microprocessor or the processor may also be any conventional processor or the like.

The memory 730 may include read only memory and random access memory and provides instructions and data to the processor 710. A portion of the memory 730 may also include a non-volatile random access memory. For example, the memory 730 may also store information of the device type.

In the implementation process, each step of the foregoing method may be completed by an integrated logic circuit of hardware in the processor 710 or an instruction in a form of software. The steps of the positioning method disclosed in combination with the embodiment of the present application may be directly implemented by the hardware processor, or may be performed by a combination of hardware and software modules in the processor 710. The software module may be located in a conventional storage medium such as random access memory, flash memory, read only memory, programmable read only memory or electrically erasable programmable memory, register, and the like. The storage medium is located in the memory 730, and the processor 710 reads the information in the memory 730 and completes the steps of the above method in combination with its hardware. To avoid repetition, it will not be described in detail herein.

The network device 700 according to the embodiment of the present application may correspond to the network device for performing the method 300 in the foregoing method 300, and the network device 500 according to the embodiment of the present application, and each unit or module in the network device 700 is used for performing operations or processes performed by the network device in the above method 300 respectively. Herein, in order to avoid redundancy, detailed description thereof will be omitted.

Figure 12:
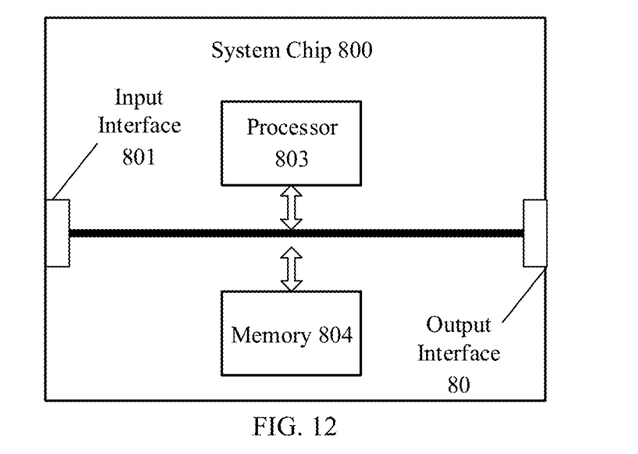
FIG. 12 is a schematic structural diagram of a system chip according to an embodiment of the present application.

FIG. 12 is a schematic structural diagram of a system chip according to an embodiment of the present application. The system chip 800 of FIG. 12 includes an input interface 801, an output interface 802, at least one processor 803, and a memory 804. The input interface 801, the output interface 802, the processor 803, and the memory 804 are interconnected by an internal connection path. The processor 803 is configured to execute codes in the memory 804.

Optionally, when the codes are executed, the processor 803 may implement a method performed by the terminal device in the method embodiment. For the sake of brevity, it will not be repeated herein.

Optionally, when the codes are executed, the processor 803 may implement a method performed by the network device in the method embodiment. For the sake of brevity, it will not be repeated herein.

It should be understood that, in various embodiments of the present application, the sequence numbers of the above processes do not mean the order of execution, and the order of execution of each process should be determined by its function and internal logic, and should not be taken to constitute any limitation to the implementation process of embodiments of the present application.

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific application and design constraints of the technical solution. A person skilled in the art may use different methods for implementing the described functions for each particular application, but such implementation should not be considered to go beyond the scope of the present application.

A person skilled in the art can clearly understand that for the convenience and brevity of the description, the specific working process of the system, the device and the unit described above can refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be another division manner. For example, a plurality of units or components may be combined or integrated into another system, or some features can be ignored or not executed. In addition, the coupling or direct coupling or communication connection shown or discussed may be an indirect coupling or communication connection through some interfaces, devices or units, which may be electrical, mechanical or otherwise.

The units described as separate components may or may not be physically separated, and the components displayed as units may or may not be physical units. That is, they may be located in one place, or may be distributed to multiple network units. Some or all of the units may be selected according to actual needs to achieve the purpose of the technical solution of the embodiment.

In addition, each functional unit in each embodiment of the present application may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present application which is essential or a part contributes to the prior art, or a part of the technical solution, may be embodied in the form of a software product, which is stored in a storage medium, including instructions to cause a computer device (which may be a personal computer, server, or network device, etc.) to perform all or part of the steps of the methods described in various embodiments of the present application. The foregoing storage medium includes: a U disk, a mobile hard disk, a Read-Only Memory ("ROM"), a Random Access Memory ("RAM"), a disk, or an optical disk or other media that can store program codes.

The above is only the specific embodiment of the present application, but the protection scope of embodiments of the present application is not limited thereto, and any person skilled in the art can easily think of changes or substitutions within the technical scope of the present application and they should be covered by the scope of the present application. Therefore, the protection scope of embodiments of the application should be determined by the protection scope of the claims.

What is claimed is:

1. A signal transmission method, comprising:
   a terminal device determining beam information about N groups of random access signals, wherein the beam information about the N groups of random access signals is identical, and each group of random access signals comprises M random access signals, M being a positive integer and N being a positive integer, and N being equal to or greater than 2;
   in a case where the terminal device sends the N groups of random access signals to a network device according to the beam information about the N groups of random access signals, while the terminal device does not receive a response message sent by the network device for the N groups of random access signals, redetermining the beam information about the N groups of random access signals; and
   the terminal device re-transmitting at least one random access signal in the N groups of random access signals to the network device according to the redetermined beam information about the N groups of random access signals.

2. The method according to claim 1, wherein the method further comprises:
   in a case where the terminal device receives a response message sent by the network device for at least one random access signal that has been sent in the N groups of random access signals during sending of the N groups of random access signals, stopping sending other unsent random access signals in the N groups of random access signals to the network device.

3. The method according to claim 1, wherein the beam information about the N groups of random access signals redetermined by the terminal device is different from beam information about the N groups of random access signals sent last time.

4. The method according to claim 1, wherein the M random access signals are sent using a same beam or different beams.

5. The method according to claim 1, wherein the beam information about each group of random access signals comprises at least one of: a beam for transmitting the M random access signals, and a corresponding relationship between a location of a time-frequency resource used to transmit the random access signals and the beam.

6. The method according to claim 1, wherein before a terminal device determining beam information about N groups of random access signals, the method further comprises:
   the terminal device receiving indication information sent by the network device, wherein the indication information is used to indicate at least one of N and M.

7. The method according to claim 6, wherein in a case where the indication information is used to indicate N, M is equal to a preset value; or
   in a case where the indication information is used to indicate M, N is equal to a preset value.

8. The method according to claim 1, wherein at least one of a time domain resource for transmitting the M random access signals, a frequency domain resource for transmitting the M random access signals, and a sequence used by the M random access signals is identical, or all of them are different.

9. The method according to claim 1, wherein a time-frequency resource for transmitting the M random access signals satisfies a preset hopping mode.

10. The method according to claim 1, wherein a time-frequency resource for transmitting the M random access signals is continuous or discontinuous in a time domain.

11. A signal transmission method, comprising:
    in a case where a network device does not successfully receive N groups of random access signals sent by a terminal device according to beam information about the N groups of random access signals, prohibiting sending a response message for the N groups of random access signals to the terminal device, wherein the beam information about the N groups of random access signals is identical, and each group of random access signals comprises M random access signals, M being a positive integer and N being a positive integer, and N being equal to or greater than 2;
    the network device re-receiving at least one random access signal in the N groups of random access signals sent by the terminal device according to redetermined beam information about the N groups of random access signals.

12. The method according to claim 11, further comprising:
in a case where the network device successfully receives the random access signal sent by the terminal device during receiving of the N groups of random access signals, sending a response message of at least one random access signal that has been received in the N groups of random access signals to the terminal device.

13. The method according to claim 11, wherein the beam information about the N groups of random access signals redetermined by the terminal device is different from beam information about the N groups of random access signals sent last time.

14. The method according to claim 11, wherein the M random access signals are sent using a same beam or different beams.

15. The method according to claim 11, wherein the beam information about each group of random access signals comprises at least one of: a beam for transmitting the M random access signals, and a corresponding relationship between a location of a time-frequency resource used to transmit the random access signals and the beam.

16. The method according to claim 11, wherein before the network device prohibiting sending a response message for the N groups of random access signals to the terminal device, the method further comprising:
the network device sending indication information to the terminal device, wherein the indication information is used to indicate at least one of N and M.

17. The method according to claim 16, wherein in a case where the indication information is used to indicate N, M is equal to a preset value; or
in a case where the indication information is used to indicate M, N is equal to a preset value.

18. The method according to claim 11, wherein at least one of a time domain resource for transmitting the M random access signals, a frequency domain resource for transmitting the M random access signals, and a sequence used by the M random access signals is identical, or all of them are different.

19. The method according to claim 11, wherein a time-frequency resource for transmitting the M random access signals satisfies a preset hopping mode.

20. The method according to claim 11, wherein a time-frequency resource for transmitting the M random access signals is continuous or discontinuous in a time domain.

21. A terminal device for signal transmission, wherein the terminal device comprises a processor, a transceiver and a memory, and the memory has instructions stored therein, which when executed by the processor, causes the terminal device to:
determine, by the processor, beam information about N groups of random access signals, wherein the beam information about the N groups of random access signals is identical, and each group of random access signals comprises M random access signals, M being a positive integer and N being a positive integer, and N being equal to or greater than 2;
in a case where the terminal device sends the N groups of random access signals to a network device according to the beam information about the N groups of random access signals, while the terminal device does not receive a response message sent by the network device for the N groups of random access signals, redetermine, by the processor, the beam information about the N groups of random access signals; and
re-transmit, by the transceiver, at least one random access signal in the N groups of random access signals to the network device according to the redetermined beam information about the N groups of random access signals.

22. The terminal device according to claim 21, wherein the transceiver is further configured to:
in a case where the terminal device receives a response message sent by the network device for at least one random access signal that has been sent in the N groups of random access signals during sending of the N groups of random access signals, stop sending other unsent random access signals in the N groups of random access signals to the network device.

23. The terminal device according to claim 21, wherein the beam information about the N groups of random access signals redetermined by the terminal device is different from beam information about the N groups of random access signals sent last time.

24. The terminal device according to claim 21, wherein the M random access signals are sent using a same beam or different beams.

25. The terminal device according to claim 21, wherein the beam information about each group of random access signals comprises at least one of: a beam for transmitting the M random access signals, and a corresponding relationship between a location of a time-frequency resource used to transmit the random access signals and the beam.

26. The terminal device according to claim 21, wherein the transceiver is further configured to:
before the processor determines beam information about N groups of random access signals, receive indication information sent by the network device, wherein the indication information is used to indicate at least one of N and M.

27. The terminal device according to claim 26, wherein in a case where the indication information is used to indicate N, M is equal to a preset value; or
in a case where the indication information is used to indicate M, N is equal to a preset value.

28. The terminal device according to claim 21, wherein at least one of a time domain resource for transmitting the M random access signals, a frequency domain resource for transmitting the M random access signals, and a sequence used by the M random access signals is identical, or all of them are different.

29. The terminal device according to claim 21, wherein a time-frequency resource for transmitting the M random access signals satisfies a preset hopping mode.

30. The terminal device according to claim 21, wherein a time-frequency resource for transmitting the M random access signals is continuous or discontinuous in a time domain.

* * * * *